United States Patent [19]
DeVito et al.

[11] Patent Number: 5,825,943
[45] Date of Patent: Oct. 20, 1998

[54] SELECTIVE DOCUMENT RETRIEVAL METHOD AND SYSTEM

[75] Inventors: Jonathan DeVito; Harry Garland, both of Los Gatos; Ken Hunter, San Francisco; Gerald A. May, Saratoga; Michael G. Roberts, Mtn. View, all of Calif.

[73] Assignee: Canon Inc., Tokyo, Japan

[21] Appl. No.: 537,314

[22] Filed: Sep. 29, 1995

Related U.S. Application Data

[63] Continuation of Ser. No. 060,429, May 7, 1993, abandoned.

[51] Int. Cl.⁶ .................................................... G06K 9/78
[52] U.S. Cl. ......................... 382/306; 382/177; 358/403
[58] Field of Search ................................... 382/305, 306, 382/177, 173; 358/403; 395/616, 761; 707/1, 500

[56] References Cited

U.S. PATENT DOCUMENTS

| | | | |
|---|---|---|---|
| 4,748,678 | 5/1988 | Takeda et al. | 382/61 |
| 4,805,099 | 2/1989 | Huber | 395/600 |
| 4,829,453 | 5/1989 | Katsuta et al. | 364/521 |
| 4,941,125 | 7/1990 | Boyne | 364/900 |
| 4,985,863 | 1/1991 | Fujisawa et al. | 382/40 |
| 5,093,873 | 3/1992 | Takahashi | 382/61 |
| 5,109,439 | 4/1992 | Froessl | 382/61 |
| 5,119,081 | 6/1992 | Ikehira | 340/723 |
| 5,133,024 | 7/1992 | Froessl | 382/41 |
| 5,133,052 | 7/1992 | Bier et al. | 395/155 |
| 5,146,404 | 9/1992 | Calloway et al. | 364/401 |
| 5,168,565 | 12/1992 | Morita | 395/600 |
| 5,179,652 | 1/1993 | Rozmanith et al. | 395/155 |
| 5,185,857 | 2/1993 | Rozmanith et al. | 395/148 |
| 5,202,985 | 4/1993 | Goyal | 395/600 |
| 5,251,316 | 10/1993 | Anick et al. | 395/612 |
| 5,438,630 | 8/1995 | Chen et al. | 382/159 |

FOREIGN PATENT DOCUMENTS

| | | | |
|---|---|---|---|
| 0 051 226 | 10/1981 | European Pat. Off. | G06F 15/40 |
| 0424803A2 | 5/1991 | European Pat. Off. | |
| 0465818A2 | 1/1992 | European Pat. Off. | |
| 0596247A2 | 5/1994 | European Pat. Off. | |
| 3-260768 | 11/1991 | Japan | G06F 15/40 |
| 3260768 | 11/1991 | Japan | |
| 3620768 | 11/1991 | Japan | |

OTHER PUBLICATIONS

Nagy et al. "A Prototype Document Image Analysis System for Technical Journals." *Computer* vol. 25, No. 7, Jul. 1992, pp. 10–22.

O'Gorman, "Image and Document Processing Techniques for the Right Pages Electronic Library System." Proc. 11ᵗʰ IAPR Int'l Conf. Pat. Rec. vol. II, Sep. 1992, pp. 260–263.

Story et al. "The Right Pages Image–Based Electronic Library for Alerting and Browsing." *Computer.* vol. 25, No. 9, Sep. 1992, pp. 17–26.

(List continued on next page.)

*Primary Examiner*—Jon Chang
*Attorney, Agent, or Firm*—Fenwick & West LLP

[57] ABSTRACT

A method and system for storing and selectively retrieving information, such as words, from a document set. The method includes generating an image data set representative of the information contained in the document set. The method also involves generating a text data set representative of a text portion of the information contained in the document set. A text-image correspondence (TIC) table is generated that includes data representative of coordinates information corresponding to each phrase of the document set. A search phrase is identified in response to user-specified search criteria and the search phrase is identified in the text image data set. Then, the TIC table is used to identify the coordinates information corresponding to the search phrase identified in the text data set. A display of the portion of the page containing the search phrase is generated using the coordinates information.

29 Claims, 3 Drawing Sheets

OTHER PUBLICATIONS

"ZyIMAGE—Information Dimensions", Information Dimensions, Inc./ZyLab, Buffalo Grove, Illinois, Apr., 1993, or earlier.

"Canon PICS: Global Networking Document Image Server", Canon Research Center America, Inc., Palo Alto, California, Oct. 1994.

"Text Search and Retrieval Reference Guide for the USPAT Fill" by PRC, 1990.

Catchings, Bill, et al., "Price Delineates Text–Retrieval Software", PC Week Reviews, May 20, 1991, (5 pages).

Copy of Sales Brochure: "Canofile 250 Desktop Electronic Filing System".

5,825,943

SELECTIVE DOCUMENT RETRIEVAL METHOD AND SYSTEM

RELATED APPLICATIONS

This is a continuation of U.S. patent application Ser. No. 08/060,429 filed on May 7, 1993 now abandoned.

BACKGROUND OF THE INVENTION

1. Field of the Invention

The present invention relates generally to the field of document storage and retrieval systems of the type used for multiple document manipulation. Specifically, the invention relates to a method and system for storing documents as both text and graphics, searching a document set for a search term, then generating a graphics display of the portion of a page from the document set containing the search term.

2. Brief Description of Background Art

Electronic storage of documents has facilitated the handling of large volumes of documents, such as those handled by hospitals, universities, government institutions, and the like. Typically, the documents are entered into massive storage systems by use of a scanner system that converts text into electronic data. Documents primarily containing text can readily be scanned and stored in various electronic forms in this manner. It is also possible to both scan a document and perform optical character recognition on the document to create stored text and image versions of the document.

Once the documents are stored, there is a need to retrieve selected documents, or selected pages from the documents. For example, a hospital may choose to maintain all patient charts in a computer storage system, and have the ability to selectively call up a document for viewing and editing.

Typical existing systems address the need for selectively retrieving a document by assigning an index to the document as it is entered into storage. The index may be a system-generated or a user-defined code. The code then is stored together with the document. To retrieve a document, a user must enter the appropriate code associated with the desired document. Other systems use predetermined key words extracted from the document which the user may then use to subsequently retrieve a document.

The problem encountered with such systems is that a user must know the index, or code, associated with a desired document. If a user enters an inappropriate index or code, then the target document may not be retrieved.

In one presently available commercial system for document storage and retrieval, documents are stored in both text and graphics form. A user may enter a search term, which may be any term in the document and is not limited to a predetermined index term. The retrieved document may then be displayed in both text form and graphics form. However, the system retrieves an entire page of the document containing the search word. Since most screen displays do not have the capacity for full page text display, the user must search through the text on the screen display to locate the search term. This process is time consuming and inconvenient for a user, especially a user working with large volume document retrieval.

Thus, there remains a method and system for storing documents and selectively retrieving documents based on any user-selected search term, without requiring a pre-indexing of the documents. There also remains a need for such a method and system for retrieving the portion of the page containing the search term, which search term preferably is identified on the retrieved page.

SUMMARY OF THE INVENTION

The present invention is a method and system for storing and selectively retrieving information, such as words, from a document set using user-defined search criteria.

The method involves generating an image data set representative of the information contained in the document set. Preferably, this image data set is generated using a scanner system. The image data set is stored, preferably as a bit-map, in memory for subsequent access.

The method also involves generating a text data set representative of a text portion of the information contained in the document set. Preferably, this text data set is generated using a character recognition system that generates ASCII, Unicode, EBCDIC, JIS, or other forms of text data.

A text-image correspondence (TIC) table is generated that includes data representative of coordinates information for phrases from the image data set. A concordance table may also be generated containing concordance data associated with the information in the text data set.

A search phrase is identified, preferably in response to user-specified search criteria. The search phrase may be an exact match to a user-specified search phrase, or may be generated in accordance with some predetermined or user-defined rules. Various methods and systems for generating the search phrase may be used, and are described in further detail below.

The search phrase is identified in the text data set. Then, the TIC table is used to identify the coordinates information corresponding to the search phrase. A display of the portion of the page containing the search phrase is generated using the coordinates information. The displayed portion may contain the phrase shown in a single page, or may be multiple portions of multiple pages, each page containing a portion of the search phrase. Preferably, the search phrase is identified, e.g., by highlighting, on the display.

The inventive system includes a stored image data set, a stored text data set, and a text-image correspondence (TIC) table, each substantially as described above. The system includes a processor which identifies a search phrase, corresponding to a user-specified search criteria, in the text data set, and coordinates information, from the TIC table, corresponding to the search phrase. The system further includes a computer display device for displaying a portion of the page containing the search phrase, based on the identified coordinates information.

BRIEF DESCRIPTION OF THE FIGURES

The accompanying drawings, which are incorporated in and form a part of the specification, illustrate embodiments of the present invention and, together with the description, explain the principles of the invention.

DETAILED DESCRIPTION OF THE PREFERRED EMBODIMENTS

The present invention involves a computer-implemented method and system for storing and selectively retrieving information from a document set. For purposes of the following discussion, the phrase "document set" includes a single document of one or more pages, and a combination of documents which are treated as a set for purposes of storing, grouping, and selective retrieving by a user. Thus, a document set may be of variable size, ranging from one page to thousands of pages, and typically are printed on paper, but may include information contained in or on other media. Each document set may consist of text only, graphics only, or a mixture of text and graphics.

Figure 1:
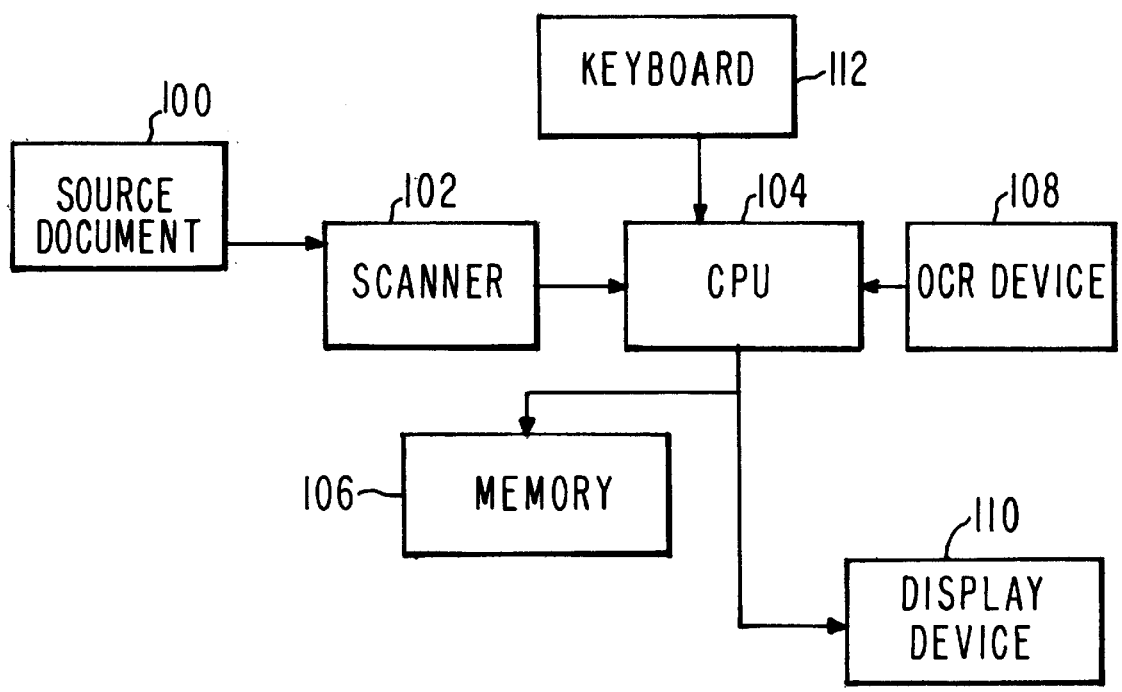
FIG. 1 is a block diagram showing the structure of an embodiment of the invention.

FIG. 1 shows a block diagram of the inventive system. The system includes a scanner device 102, including a sensor array for scanning documents and converting the image information of each document 100 to a digital information stream. The sensor array may be of any type generally commercially available. The information provided by the sensor array represents the information on the scanned document 100, and is a digital bit stream provided to a processor 104. The processor 104 may be any one of a number of suitable general purpose digital computers. The image data is stored in a storage device 106.

Alternatively, the image data may be introduced into the processor 104 via electronic media, such as facsimile or e-mail. In that system (not shown), a facsimile device or electronic mail system is used in conjunction with the present document storage and retrieval system.

Preferably, the processor 104 is provided with software for converting the image data, which may be in the form of bit-mapped information, into text data, such as ASCII character data. The text recognition software for recognizing text and generating text data from bit-mapped image data presently is available and/or can be generated from commercially available software without undue experimentation.

The recognition is accomplished by the system either by dedicated logic, by software, or by a combination of special logic and software, although software appears to be more common and more efficient in currently manufactured systems. In this context, "recognition" means the conversion of the signals representative of characters forming the image into code representations of those characters. Preferably, this would be ASCII code so that it can be imported into other programs, transmitted, or otherwise processed in conventional fashions. However, other codes may be used, such as Unicode, EBCDIC, or JIS. The invention may be used in conjunction with a variety of commercially available scanner devices.

Figure 2:
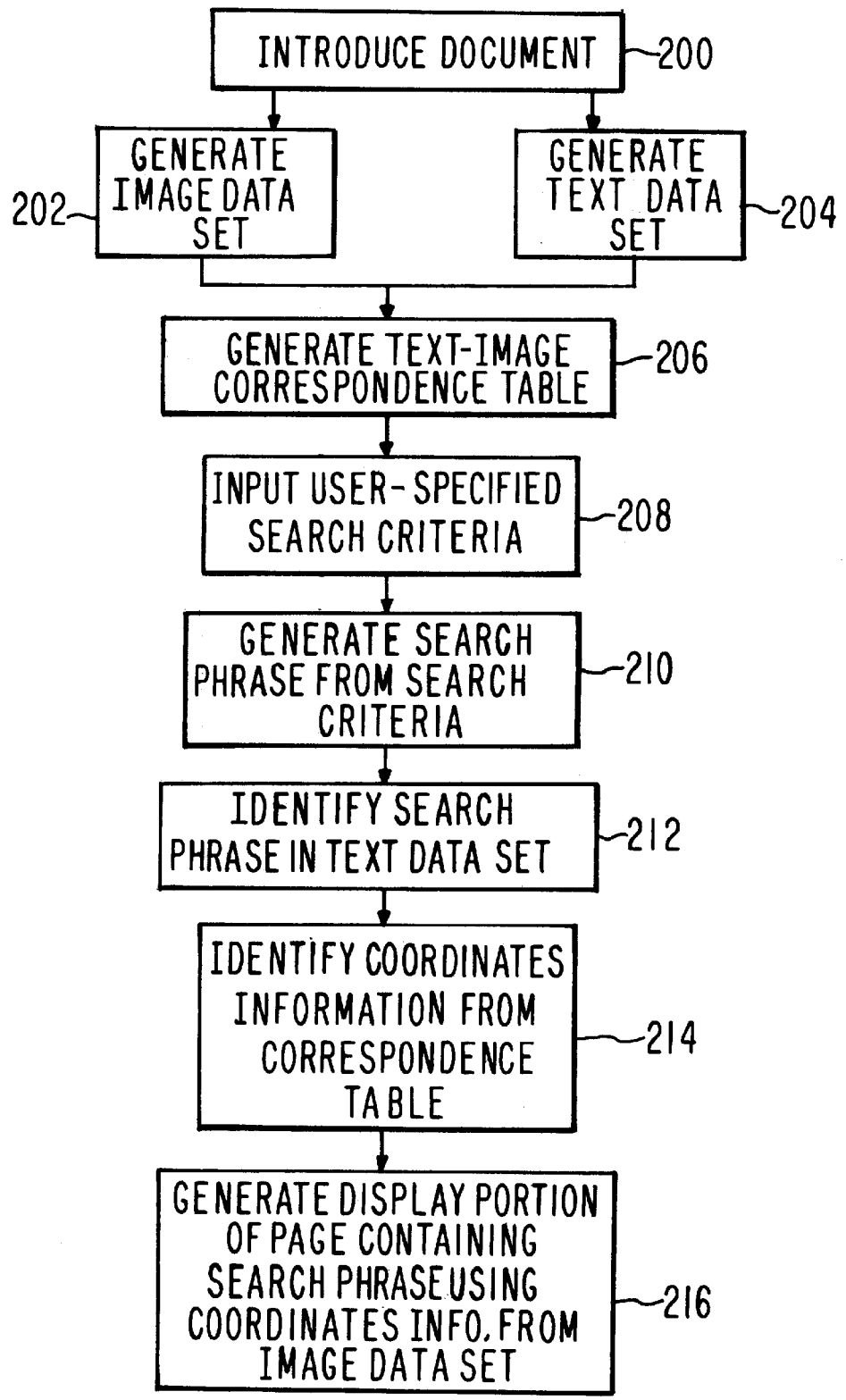
FIG. 2 is a flow chart illustrating an embodiment of the present invention.

Turning now to FIG. 2, that shows a flow chart of an embodiment of the inventive method as implemented in the system described above. Initially, a document is introduced 200 into an optical scanner 102 for scanning or electrooptical conversion to produce image signals representative of the information on the source document. As mentioned above, an alternative embodiment may include electronically transmitting document information to the processor 104, instead of scanning printed copies of the document set.

Following scanning of the document, or otherwise generating 202 an image data set, which includes information contained on the face of the scanned source document, the image data set may be compressed, preferably using JPEG or other known compression systems. Using compression on the image data set may result in a loss of some accuracy, but is desirable to reduce the amount of required memory.

Figure 3:
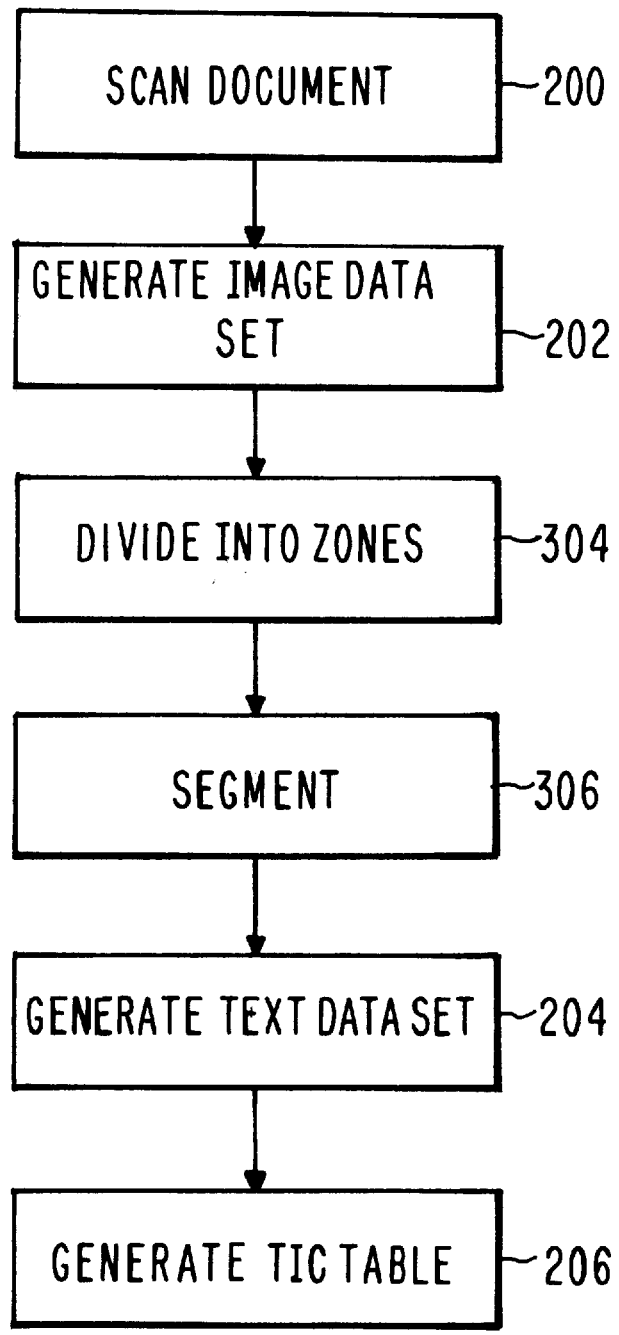
FIG. 3 is a flow chart illustrating an expanded portion of the flow chart of FIG. 2.

A text data set is generated 204 that corresponds to the information on the document obtained using an OCR 108 or other comparable character recognition system. FIG. 3 is a flow chart showing an expanded version of the flow chart of FIG. 2.

As discussed above, the information is scanned 200, or otherwise entered, to generate 202 an image data set. The image data set is then divided 304 into zones, wherein text is distinguished from graphics. Consider the following contents of an exemplary image data set:

| This | is | a | document | that | has | been |
| scanned | into | a | computer | system | and |
| segmented | into | words | using | pattern |
| recognition | technology |

The division of zones is represented by the horizontal lines that appear between the lines of text. Next, the image data set is segmented 306 by dividing the individual words. Consider now the above Example after segmenting 306:

| This | is | a | document | that | has | been |
|---|---|---|---|---|---|---|
| scanned | into | a | computer | system | and |
| segmented | into | words | using | pattern |
| recognition | technology |

The segmentation is represented by vertical lines that appear between the words of text. Using the information obtained following the zoning and segmenting steps, it is possible to identify the coordinates of the interstices.

These coordinates correspond to the intersections of the lines formed by the zoning 304 and segmenting 306 steps, as shown in the Example:

Example: 
(x1,y1)　(x3,y3)　(x5,y5)　(x7,y7)

| This | is | a | document |
|---|---|---|---|

(x2,y2)　(x4,y4)　(x6,y6)　　(x8,y8)

A parsing algorithm also may be used to eliminate certain data, such as punctuation and formatting, to reduce the data set. The text data set is generated 204 from the stored image data set, preferably using OCR technology.

A text-image correspondence (TIC) table is generated 206 that contains the interstitial coordinates information. The TIC table includes information correlating the text data set with the coordinates information of the image data set. An exemplary TIC table is as follows:

| Text data set | Image data set |
|---|---|
| This | x1,y1 x2,Y2 |
| is | x3,y3 x4,y4 |
| a | x5,y5 x6,y6 |
| document | x7,y7 x8,y8 |

The TIC table may be retained in a storage device as a look-up table, accessible by the processor 204 of the system. The TIC table links the instances of phrases contained on the document, as maintained in the text data set, with the specific locations of the phrases as contained in the image data set.

Once the TIC table and both data sets are stored, a user may input 208 search criteria to locate a phrase within the stored document. The search criteria may be predetermined criteria, presented to the user in the form of a listing or menu of options in a graphical user interface on a computer screen display, or by other limitations imposed by the specific system. In a preferred embodiment, the user specifies the search criteria.

For purposes of this discussion, the term "phrase" shall include a word, phrase, character, or character string that a user may select from a document set. Punctuation may or may not be treated as a phrase, depending on the specific requirements of the system. In a preferred embodiment, the coordinates correspond to diagonally opposing points of a rectangle defining an area in which a phrase is located in the individual document. Other schemes for identifying the location of phrases in a document set may be used, for example by identifying other geometrically defining points.

A search phrase then is generated 110 based on the search criteria. For example, in a hospital record environment, the search criteria may simply be "all records of Jones". The resulting search phrase will be "Jones". Another example is an exact search criteria, wherein the user specified "Jones", and only an exact match "Jones" will be retrieved. Similarly, the search criteria may include non-literal searches, enabling the user to specify search criteria that would result in search phrases belonging to an identified group or class. For example, in the hospital record environment, a user may select as the search criteria "all first names beginning with the letter 'P'". A listing of search phrases will include, for example, the phrases "Paul", "Pauline", and "Peter". It may be possible to use a variety of searching schemes available to those skilled in the art.

Once the search phrase is generated from the search criteria information, the search phrase is identified 212 in the text data set. Standard searching algorithms and schemes may be used and are readily available to those skilled in the art. These searching algorithms may include the use of concordance tables, and other schemes available for expediting the search.

The coordinates information for the identified search phrase in the text data set are identified 214 from the TIC table. The coordinates information identifies the specific location of the search phrase in the document set. Preferably, once the first occurrence of the search phrase within the text data set is identified, the TIC table is accessed to identify 214 the coordinates information. However, in another embodiment, all occurrences of a search phrase may be identified 212 prior to identifying 214 the corresponding coordinates information.

Once the coordinates information is identified 214 from the TIC table, a display of the portion of the document containing the search phrase is generated 216 on a display device 110 from the image data set. The significance of generating the display from the image data set is most notable for instances when the search results are disjoint. That is, when the search phrase is located on two lines (i.e., it is in a hyphenated form) or split between two different pages (e.g., for phrases containing two or more words). It may even be possible for a search phrase to be split between several pages. In those special instances, using coordinates information for phrases enables the system to generate a display containing the entire search phrase, even though the display may contain a portion of two different pages from the document set.

Several document display modes may be implemented. In a preferred mode, a graphic image is constructed from the image data set, providing the user with an exact image of the scanned document. The display would include both textual and non-textual portions of the document.

In a preferred embodiment, the display includes some indication of the search phrase. Specifically, the search phrase may be highlighted or otherwise graphically indicated to the user on the computer display screen 210. Since the display is generated 216 from the image data set, it is possible to backlight, or otherwise indicate the search phrase on the retrieved portion of the document set.

What is claimed is:

1. A method implemented on a digital computer for storing and selectively retrieving information contained in a set of documents originally located external to said computer, wherein said document set includes at least one page, said method comprising:

A. generating a bit-mapped image data set representative of information contained in the document set;

B. storing the image data set in a first memory storage device associated with said computer;

C. generating a text data set representative of a text portion of the information contained in the document set;

D. storing the text data set in a second memory storage device associated with said computer;

E. generating a text-image correspondence table including information representative of correlations between each phrase within the stored text data set and two-dimensional coordinates of a corresponding location within the stored image data set;

F. identifying a search phrase, corresponding to user-specified search criteria, in the stored text data set;

G. identifying two-dimensional coordinates corresponding to the search phrase from the text-image correspondence table; and H. generating a display of at least that image data, from within the stored image data set and by using said identified two-dimensional coordinates, corresponding to said search phrase.

2. The method of claim 1, wherein Step H further comprises indicating at least a portion of the search phrase on the displayed image data.

3. The method of claim 1, wherein Step C comprises performing optical character recognition on the stored image data set to generate the text data set.

4. The method of claim 3, wherein the step of performing optical character recognition further comprises segmenting the text portion and the graphics portion from the information contained in the document set.

5. The method of claim 1, wherein the text data set comprises one from the group consisting of: ASCII; Unicode; EBCDIC; and JIS.

6. The method of claim 1, wherein the document set comprises a plurality of pages and Step H comprises generating a display of a portion of each of several pages of the document set, wherein each displayed page portion contains at least a portion of the search phrase and all of said displayed page portions are displayed simultaneously.

7. The method of claim 1 wherein each phrase is a word.

8. The method of claim 1 wherein the generating step comprises generating a display of a portion of a page of the document set containing said image data corresponding to said search phrase.

9. The method of claim 1 wherein the step of identifying a search phrase includes the use of a concordance table.

10. The method of claim 1 wherein the image data set is subjected to a parsing algorithm to eliminate extraneous data, wherein the extraneous data comprises data from the group of data comprising punctuation and formatting.

11. The method of claim 1 wherein the search criteria are predetermined criteria presented to the user in the form of a menu of options in a graphical user interface on a computer screen display associated with said computer.

12. The method of claim 1 wherein the text-image correspondence table is accessed once the first occurrence of the search phrase is identified within the text data set.

13. The method of claim 1 wherein the text-image correspondence table is accessed after all occurrences of the search phrase are identified within the text data set.

14. The method of claim 1 wherein the step of generating a display includes highlighting the search phrase within the image data.

15. The method of claim 1 wherein the step of generating a text data set converts all text within the information contained in the document set into computer-readable code.

16. The method of claim 1 wherein the set of documents is a set of paper documents.

17. A method implemented on a digital computer for storing and selectively retrieving information contained in a set of documents originally located external to said computer, wherein said document set includes at least one page, said method comprising:

A. generating a bit-mapped image data set representative of information contained in the document set;

B. storing the image data set in a first memory storage device associated with said computer;

C. generating a text data set representative of a text portion of the information contained in the document set;

D. storing the text data set in a second memory storage device associated with said computer;

E. generating a text-image correspondence table including information representative of correlations between each phrase within the stored text data set and two-dimensional coordinates of a corresponding location within the stored image data set;

F. generating a set of non-literal search terms, in accordance with a predetermined set of rules, corresponding to user-specified search criteria;

G. identifying at least one of the non-literal search terms in the stored text data set;

H. identifying two-dimensional coordinates corresponding to the non-literal search term(s) from the text-image correspondence table; and I. generating a display of at least that image data identified in Step H, from within the stored image data set and by using said identified two-dimensional coordinates.

18. The method of claim 17, wherein Step I further comprises indicating at least a portion of the non-literal search term on the displayed image data.

19. The method of claim 17, wherein Step C comprises performing optical character recognition on the stored image data set to generate the text data set.

20. The method of claim 19, wherein the step of performing optical character recognition further comprises segmenting the text portion and the graphics portion from the information contained in the document set.

21. The method of claim 19, wherein the document set comprises a plurality of pages and Step I comprises generating a display of a portion of each of several pages of the document set, wherein each displayed page portion contains at least a portion of the non-literal search term and all of said displayed page portions are displayed simultaneously.

22. The method of claim 17, wherein the text data set comprises one from the group consisting of: ASCII; Unicode; EBCDIC; and JIS.

23. The method of claim 17, wherein Step B further comprises compressing the image data set.

24. A computer-based system for storing and selectively retrieving information contained in a set of documents originally located external to said computer, said document set including at least one page, said system comprising:

A. a stored bit-mapped image data set associated with said computer and representative of information contained in the document set;

B. a stored text data set associated with said computer and representative of a text portion of the information contained in the document set;

C. a text-image correspondence table including information representative of correlations between each phrase within the stored text data set and two-dimensional coordinates of a corresponding location within the stored image data set;

D. means for identifying a search phrase, corresponding to user-specified search criteria, in the stored text data set;

E. means for identifying two-dimensional coordinates corresponding to the search phrase from the text-image correspondence table; and F. means for generating a display of at least that image data identified in paragraph E above from within the stored image data set and by using said identified two-dimensional coordinates.

25. The system of claim 24, further comprising means for indicating at least a portion of the search phrase on the displayed image data.

26. The system of claim 24, further comprising an optical character recognition (OCR) device for performing OCR on the stored image data set to generate the text data set.

27. The system of claim 24, wherein the text data set comprises one from the group consisting of: ASCII; Unicode; EBCDIC; and JIS.

28. A method implemented on a digital computer for storing and selectively retrieving information contained in a set of documents originally located external to said computer, wherein said document set includes at least one page, said method comprising:

A. generating a bit-mapped image data set representative of information contained in the document set;

B. storing the image data set in a first memory storage device associated with said computer;

C. generating a text data set representative of a text portion of the information contained in the document set;

D. storing the text data set in a second memory storage device associated with said computer;

E. generating a text-image correspondence table including information representative of correlations between each phrase within the text data set and two-dimensional coordinates of a corresponding location within the image data set;

F. identifying a search phrase, corresponding to user-specified search criteria, in the text data set;

G. identifying, within the image data set and by means of using said coordinates, image data corresponding to the search phrase identified in the text data set; and H. generating a display of at least that image data corresponding to said search phrase, said generating step not displaying any text data;

wherein each corresponding location within the image data set comprises a two-dimensional beginning boundary point and a two-dimensional ending boundary point.

29. A method implemented on a digital computer for storing and selectively retrieving information contained in a set of documents originally located external to said computer, wherein said document set includes at least one page, said method comprising:

A. generating a bit-mapped image data set representative of information contained in the document set;
B. storing the image data set in a first memory storage device associated with said computer;
C. generating a text data set representative of a text portion of the information contained in the document set;
D. storing the text data set in a second memory storage device associated with said computer;
E. generating a text-image correspondence table including information representative of correlations between each phrase within the text data set and two-dimensional coordinates of a corresponding location within the image data set;
F. identifying a search phrase, corresponding to user-specified search criteria, in the text data set;
G. identifying, within the image data set and by means of using said coordinates, image data corresponding to the search phrase identified in the text data set; and
H. generating a display of at least that image data corresponding to said search phrase, said generating step not displaying any text data;
wherein the image data set is divided by a first set of parallel lines into a set of zones and then further divided by a second set of parallel lines, orthogonal to the first set of parallel lines, to create a set of points that define said two-dimensional coordinates.

* * * * *